US012668450B2

(12) United States Patent
Bengtsson et al.

(10) Patent No.: US 12,668,450 B2
(45) Date of Patent: Jun. 30, 2026

(54) BANKNOTE STACK TRANSPORT ARRANGEMENT AND A CASH HANDLING MACHINE

(71) Applicant: Scan Coin AB, Malmö (SE)

(72) Inventors: Kristian Bengtsson, Bjärred (SE); Victor Wallman-Carlsson, Malmö (SE); Joel Hansson, Trelleborg (SE)

(73) Assignee: Scan Coin AB, Malmö (SE)

( * ) Notice: Subject to any disclaimer, the term of this patent is extended or adjusted under 35 U.S.C. 154(b) by 0 days.

(21) Appl. No.: 18/992,334

(22) PCT Filed: Jun. 28, 2023

(86) PCT No.: PCT/EP2023/067712

§ 371 (c)(1),
(2) Date: Jan. 8, 2025

(87) PCT Pub. No.: WO2024/008541

PCT Pub. Date: Jan. 11, 2024

(65) Prior Publication Data

US 2026/0008644 A1 Jan. 8, 2026

(30) Foreign Application Priority Data

Jul. 8, 2022 (SE) .................................... 2250872-5

(51) Int. Cl.
*B65H 31/30* (2006.01)
*B65H 29/40* (2006.01)
*G07D 11/16* (2019.01)

(52) U.S. Cl.
CPC ......... *B65H 31/3027* (2013.01); *B65H 29/40* (2013.01); *G07D 11/16* (2019.01);
(Continued)

(58) Field of Classification Search
CPC ................ B65H 31/3027; B65H 29/40; B65H 2301/42146; B65H 2301/42262; B65H 2701/1912; G07D 11/16; G07D 2211/00
(Continued)

(56) References Cited

U.S. PATENT DOCUMENTS

| | | | |
|---|---|---|---|
| 5,106,077 | A | 4/1992 | Kawaguchi et al. |
| 2013/0099439 | A1 | 4/2013 | Duesterhus |
| 2020/0058184 | A1 | 2/2020 | Tang et al. |

FOREIGN PATENT DOCUMENTS

| | | | |
|---|---|---|---|
| WO | 2020/250701 | A1 | 12/2020 |
| WO | 2022/101335 | A1 | 5/2022 |

*Primary Examiner* — Daniel A Hess
(74) *Attorney, Agent, or Firm* — Capitol City TechLaw

(57) ABSTRACT

A banknote stack transport arrangement for a cash handling machine may include a first structure presenting a first banknote engagement portion being displaceable in relation to the first structure, and a second structure presenting a second banknote engagement portion being displaceable in relation to the second structure. The first structure may be pivotally arranged at its first end so as to be swingably movable between a closed configuration and an open configuration. The second structure may be pivotally arranged at its second end so as to be swingably movable between a rest position and an active position at which the second structure is configured to press the banknote stack towards the first banknote engagement portion. The banknote stack transport arrangement may be configured to transport the banknote stack out from the temporary banknote receptacle by displacing the first and the second banknote engagement portions and by moving the second structure to the active position.

14 Claims, 8 Drawing Sheets

(52) U.S. Cl.
CPC .............. *B65H 2301/42146* (2013.01); *B65H 2301/42262* (2013.01); *B65H 2701/1912* (2013.01); *G07D 2211/00* (2013.01)

(58) Field of Classification Search
USPC .......................................................... 235/7 R
See application file for complete search history.

BANKNOTE STACK TRANSPORT ARRANGEMENT AND A CASH HANDLING MACHINE

This application claims priority under 35 USC 119(a)-(d) from SE patent application No. 2250872-5 filed on Jul. 8, 2022, the entire contents of which are incorporated herein by reference.

FIELD OF THE DISCLOSURE

The present disclosure relates to a banknote stack transport arrangement and a cash handling machine comprising the same. The disclosure further relates to a method for transporting one or more banknotes inside a cash handling machine.

BACKGROUND ART

Banknote transport arrangements are known in the art. A common kind of banknote transport arrangement is used to transport banknotes one by one within cash handling machines such as ATM machines or the like. Another kind of banknote transport arrangement is capable of transporting complete stacks of banknotes. This kind of banknote transport arrangement is termed herein as banknote stack transport arrangements. A problem with banknote stack transport arrangements in the art is that they may sometimes lead to one or more banknotes not being transported together with the rest of the banknotes of the stack. The problem may occur e.g. due to the banknote stack being misaligned in the banknote stack transport arrangement and/or one or more banknotes of the stack being damaged e.g. by folds, tears, holes and foil wear. There is thus a need in the art for an improved banknote stack transport arrangement.

SUMMARY

It is an object to mitigate, alleviate or eliminate one or more of the above-identified deficiencies in the art and disadvantages singly or in any combination. These and other objects are at least partly met by the invention as defined in the independent claims. Preferred embodiments are set out in the dependent claims.

According to a first aspect there is provided a banknote stack transport arrangement for a cash handling machine, comprising:

- a first structure having first and second ends and presenting a first banknote engagement portion being displaceable in relation to the first structure;
- a second structure having first and second ends and presenting a second banknote engagement portion being displaceable in relation to the second structure;
- wherein the first structure is pivotally arranged at its first end so as to be swingably movable between:
  - a closed configuration at which the first and second structures are distanced from each other at the first associated ends for allowing one or more banknotes to enter in between the same, and at which the first and second banknote engagement portions are in contact with each other at the second associated ends such that they together form at least a bottom part of a temporary banknote receptacle configured to receive the one or more banknotes and support a formation of a banknote stack therein, such that the first banknote engagement portion contacts a face side of the banknote stack and the second banknote engagement portion contacts an edge side of the banknote stack; and
  - an open configuration at which the first and second banknote engagement portions are separated from each other at the second associated ends so as to define an exit gap;
- wherein the second structure is pivotally arranged at its second end so as to be swingably movable between:
  - a rest position at which the first and second structures are distanced from each other at the first associated ends; and
  - an active position at which the second structure is configured to press the banknote stack towards the first banknote engagement portion, and
- wherein the banknote stack transport arrangement is configured to transport the banknote stack out from the temporary banknote receptacle via the exit gap by moving the second structure from the rest position to the active position and by displacing the first and second banknote engagement portions in relation to the first and second structures.

The banknote stack transport arrangement may be advantageous as it allows stacking the banknotes before transporting them to a secondary location, such as e.g. a safe, within a cash handling machine. The stacking allows reducing the overall volume of the banknotes in the secondary location, which location hence could be made smaller and/or may be emptied less frequently. Furthermore, the banknote stack transport arrangement makes it easier to configure a cash handling machine for allowing a user to cancel a depositing operation. The banknote transport arrangement may be configured to hold the deposited banknotes in the temporary banknote receptacle (sometimes referred to as escrow) and await a final confirmation from the user before transporting the banknotes to the secondary location, such as e.g. the safe.

The banknote stack transport arrangement may be advantageous as it allows for reducing the number of times one or more banknotes for various reasons cannot be transported by the banknote stack transport arrangement. There are several reasons why the banknote stack transport arrangement may be advantageous. Firstly, the banknote stack is supported from two sides by the first and second banknote engagement portions, respectively. As the first and second banknote engagement portions start to displace in relation to their associated structures, the banknote stack will have few, or no, non-moving obstacles in its way which could potentially block or jam the transport process. Secondly, moving the second structure to the active position may aid the transport of the banknote stack by pressing it towards the first banknote engagement portion. This may be especially beneficial when there are few or even single banknotes in the stack and where one or more banknotes are damaged or twisted. The second structure will press the banknotes firmly towards the first banknote engagement portion, thereby reducing the risk of jam or blockage. The banknote stack transport arrangement may have a further advantage in that it provides a simplified design as compared to existing solutions in the art. Specifically, the first and second banknote engagement portions are capable of forming a receptacle, termed here as the temporary banknote receptacle, by their mere arrangement with respect to each other. No further parts are needed in this respect.

By the term “transport” is here meant the full process of transferring the banknote stack out from the temporary banknote receptacle through the exit gap such that the banknote stack exits the temporary banknote receptacle and enters the secondary location, such as e.g. a safe, within the cash handling machine. The transport involves displacing the first and second banknote engagement portions in relation to the first and second structures, thereby forcing the banknote stack towards a bottom of the temporary banknote receptacle and out through the exit gap. Moreover, it should be understood that the banknote stack transport arrangement is further configured such that the transport may involve also moving the second structure from the rest position to the active position, thereby pressing the banknote stack towards the first banknote engagement portion. Although moving the second structure to the active position does not directly provide a force moving the banknote stack, it is still considered as being a part of the process of transporting the banknote stack, since it may aid the process.

As readily appreciated by the person skilled in the art, displacing the first and second banknote engagement portions in relation to the first and second structures may be sufficient to transport the banknote stack out from the temporary banknote receptacle. The displacement will force the banknote stack towards a bottom of the temporary banknote receptacle (i.e. at the second associated ends of the first and second structures). The force from the banknotes will force the first structure to swing outwardly such that it distances itself from the second structure at their second associated ends, thereby forming the exit gap for allowing the banknote stack to leave the temporary banknote receptacle at the bottom thereof. There may however be situations where the displacement of the first and second banknote engagement portions is not enough for reliably transporting the banknote stack out from the temporary banknote receptacle. Typically, such situations occur when the banknote stack includes few banknotes and/or the banknotes of the stack are not correctly aligned in the temporary banknote receptacle, and/or one or more banknotes of the banknote stack are damaged e.g. by folds, tears, holes and foil wear. For such situations, moving the second structure to the active position may aid in the transport process by pressing the banknote stack towards the first banknote engagement portion, thereby reducing the risk that one or more banknotes of the banknote stack are prevented from being transported out from the temporary banknote receptacle. Thus, although the banknote stack transport arrangement is configured to move the second structure from the rest position to the active position, this may not necessarily occur for every situation of transporting a banknote stack. The banknote stack transport arrangement may for example be configured to move the second structure from the rest position to the active position only for situations of transporting a banknote stack when such aid is beneficial to the transport process.

The term "banknote stack transport arrangement" should be construed as one or more features within a cash handling machine which features together are capable of carrying out a transport of a banknote stack. The term should not be construed as limited only to a module or stand-alone device which e.g. could be readily inserted in the cash handling machine. In some cash handling machines, the banknote stack transport arrangement may instead form one of several parts of more extensive modules. In other cash handling machines, the banknote stack transport arrangement may be an integral part of the machine. As the term implies, the banknote stack transport arrangement is an arrangement for transporting banknote stacks, i.e. two or more banknotes which are stacked on top of each other face to face. However, as readily appreciated by the person skilled in the art, the banknote stack transport arrangement may also transport banknotes one by one in situations where only one banknote is provided to the banknote stack transport arrangement.

The first and second structures act as support structures for their associated banknote engagement portions. The first structure may be configured to move from the closed configuration to the open configuration in response to the displacing of the first and second banknote engagement portions in relation to said first and second structures.

It should be understood that banknotes come in different sizes and may be aligned in different ways in the banknote stack transport arrangement. Furthermore, banknote stacks come in different thicknesses dependent on the number of banknotes in the stack. Therefore, the claim language "the first banknote engagement portion contacts a face side of the banknote stack" and "the second banknote engagement portion contacts an edge side of the banknote stack" should not be construed as ruling out the presence of further contact and support surfaces and/or elements of the banknote stack transport arrangement which, together with the first and second banknote engagement portions, provide support for the banknote stack. Specifically, the temporary banknote receptacle may comprise such further contact surfaces and/or elements for supporting the banknote stack.

The term "banknote engagement portion" should be construed as a portion of its associated structure which is displaceable in relation to said structure. As will be described in detail later, the banknote engagement portion may be embodied in different ways, e.g. by conveyor belts, rollers, or wheels. This implies that the term "banknote engagement portion" should be interpreted broadly. The banknote engagement portion may be defined by more than one element (such as e.g. a plurality of conveyor belts or a plurality of rollers) and/or may present more than one surface for contacting and supporting the banknote stack. The first and second structures may present first and second surfaces, respectively. The surfaces may be support and transport surfaces. The first and second surfaces may be planar, or substantially planar. The first and second banknote engagement portions may each be displaceable in relation to its associated structure along a displacement direction defined from the first end to the second end. The first and second banknote engagement portions may each extend, at least partly, between the first end and the second end of its associated structure. The first and second banknote engagement portions may form an oblique angle in between each other when the banknote stack transport arrangement is in the closed configuration. For some embodiments, the oblique angle is an acute angle. This implies that the bottom part of the temporary banknote receptacle may be V-shaped or substantially V-shaped. The first and second structures may be arranged in the cash handling machine such that their associated first ends are located above their associated second ends. This implies that the banknote stack may be transported out from the banknote stack transport arrangement along a downward or substantially downward direction.

The language "configured to press the banknote stack" should not be construed as limited to embodiments where the second structure is structured and arranged to, in an absence of banknotes in the temporary banknote receptacle, make contact with the first banknote engagement portion. As readily appreciated by the person skilled in the art, a banknote stack may be pressed towards the first banknote engagement portion even for embodiments where the second structure cannot make contact with the first banknote engagement portion if only the dimensions of the banknote stack is sufficiently large. However, for preferred embodiments, the second structure is structured and arranged to, in an absence of banknotes in the temporary banknote receptacle, make contact with the first banknote engagement portion. Furthermore, the language "configured to press the banknote stack" implies that a distance between the second structure and the first banknote engagement portion decreases as the second structure moves from the rest position towards the active position. In other words, the second structure moves in a direction towards the first banknote engagement portion during said movement from the rest position towards the active position.

According to some embodiments, the banknote stack transport arrangement is configured to transport the banknote stack out from the temporary banknote receptacle via the exit gap in one displacement operation.

This may be advantageous as it provides an efficient transport operation of the banknote stack. In most situations, one operation is enough for transporting the banknote stack out from the temporary banknote receptacle. This implies that it may be sufficient to provide one displacement operation of the first and second banknote engagement portions to completely empty the temporary banknote receptacle. However, there may be situations where one operation is not enough. For such situations, the banknote stack transport arrangement may be configured to perform other actions, such as but not limited to: stop displacing the first and second banknote engagement portions, moving the second structure to the active position, and displacing the first and second banknote engagement portions in a reverse direction.

The first and second banknote engagement portions may be embodied in different ways by different displacement means. For example, each of the first and second banknote engagement portions may be defined by one or more conveyor belts. This implies that the conveyor belt surface(s) which faces the temporary banknote receptacle may define the displaceable second banknote engagement portion. Alternatively, or additionally, each of the first and second banknote engagement portions may be defined by one or more wheels and/or one or more rollers. This implies that the outwardly facing enveloped surface of the one or more wheels and/or rollers may define the displaceable second banknote engagement portion. Alternatively, or additionally, each of the first and second banknote engagement portions may be defined by one or more chains. This implies that the chain surface(s) which faces the temporary banknote receptacle may define the displaceable second banknote engagement portion. The disclosure should not be construed as limited to any one of these displacement means. Any means for providing the first and/or second banknote engagement portion to be displaceable in relation to its associates structure, will be equally applicable within the scope of the appended claims. Some particular examples will be provided in what follows.

According to some embodiments, the first banknote engagement portion is defined by one or more conveyor belts.

This may be advantageous as it may provide a relatively large surface area available for contacting the banknote stack. Having a relatively large surface area allows for a more reliable transport of the banknote stack, because the risk of the first banknote engagement portion losing fixed contact with the banknote stack, i.e. starts to slip, is reduced. A further advantage of using conveyor belts may be that conveyor belts typically are made from materials having high friction properties, thus further reducing the risk of slipping.

According to some embodiments, the second banknote engagement portion is defined by one or more conveyor belts.

This may be advantageous for essentially the same reasons given hereinabove with respect to the first banknote engagement portion. Furthermore, it may be beneficial to provide a substantially flat surface for supporting edge side of the banknote stack in the temporary banknote receptacle. This may facilitate stacking the banknotes more evenly, and thereby also facilitate the banknote stack transport process.

According to some embodiments, the second banknote engagement portion is defined by one or more rollers.

This may be advantageous as it provides a simplified system. For example, the second banknote engagement portion may be defined by one or more main rollers disposed at the second end of the second structure. The one or more main rollers may be one main roller. Said one main roller may have an extension long enough to cover the entire length of the banknote stack. This may improve the banknote stack transport process as it increases the overall contact area between the main roller and the banknote stack.

To operate the banknote stack transport arrangement to transport the banknote stack out from the temporary banknote receptacle, at least one of the first and second banknote engagement portions must be actively displaced. This implies that the displacement means of at least one of the first and second banknote engagement portions must be connected to a drive unit, such as e.g. a motor. However, as readily appreciated by the person skilled in the art, it may be sufficient to provide active displacement to one of the banknote engagement portions, and allow the other banknote displacement portion to displace in response to the displacement of the banknote stack with which it is in contact. For example, the first banknote engagement portion may be actively displaced, whereas the second banknote engagement portion may be passively displaced in response to the displacement of the first banknote engagement portion. Preferably, both the first and the second banknote engagement portions are actively displaced.

According to some embodiments, the first structure is biased towards the second structure to the closed configuration.

This may be advantageous because it allows the first structure to move from the closed configuration to the open configuration passively as a result from the displaced banknote stack forcing the opening of the exit gap by its own displacement. Thus, for these embodiments, no active drive mechanism will be needed to move the first structure from the closed configuration to the open configuration.

The first structure may be swingably movable between the closed and the open configuration by being pivotally arranged at the first end along a first pivot axis. This may be embodied in different ways, for example by providing a through-shaft, or separate hinges.

The second structure may be swingably movable between the rest position and the active position by being pivotally arranged at the second end of the second structure along a second pivot axis. This may be embodied in different ways, for example by providing a through-shaft, or separate hinges.

According to some embodiments, the second banknote engagement portion extends to the first end of the second structure, and wherein the second structure is configured to, in the active position, press the banknote stack towards the first banknote engagement portion by means of the second banknote engagement portion.

This may be advantageous as it provides a larger contact area between the banknotes and the banknote engagement portions. A larger contact area may reduce the risk that banknotes are prevented from moving during the displacement of the first and second banknote engagement portions.

The second banknote engagement portion may be defined by one or more main rollers at the second end. This implies that the enveloped surface of the one or more main rollers which faces the temporary banknote receptacle may define the displaceable second banknote engagement portion. The one or more main rollers may be actively controlled. The one or more main rollers at the second end of the second structure may be in contact with the first banknote engagement portion at the second end of the first structure. The second banknote engagement portion may be further defined by one or more support rollers disposed between the main rollers and the first end of the second structure. This implies that the enveloped surface of the one or more support rollers which faces the temporary banknote receptacle may further define the displaceable second banknote engagement portion. Thus, the enveloped surfaces of the one or more main rollers and the one or more supporting rollers which faces the temporary banknote receptacle may together define the (displaceable) second banknote engagement portion. Alternatively, the second banknote engagement portion may be defined by one or more conveyor belts, as mentioned earlier.

According to some embodiments, the second structure further presents a banknote engaging surface disposed between the second banknote engagement portion and the first end, and wherein the second structure is configured to, in the active position, press the banknote stack towards the first banknote engagement portion by means of both the second banknote engagement portion and the banknote engaging surface.

This implies that the banknote engaging surface is not displaceable in relation to the second structure. Thus, the banknote engaging surface will not follow the displacement of the second banknote engagement portion during the banknote stack transport process. This may be advantageous as it provides a simplified solution. The more limited extension of the banknote engagement portion on the second structure may allow reducing the number of, and/or dimensions of mechanical means dedicated for providing the displacement (such as rollers and/or conveyor belts and/or wheels, as detailed hereinabove). For example, the second banknote engagement portion may be defined by one or more main rollers disposed at the second end. This implies that the enveloped surface of the one or more main rollers which faces the temporary banknote receptacle may define the (displaceable) second banknote engagement portion. The second banknote engagement portion may thus be limited to the lower part of the temporary banknote receptacle. The banknote engaging surface may be a substantially flat surface. Preferably, the banknote engaging surface has low-friction properties. This may for example be realised by providing a plurality of fins protruding outwardly from the banknote engaging surface.

According to some embodiments, the banknote stack transport arrangement is configured to:

initiate said displacing of the first and second banknote engagement portions at a first time position, and initiate said moving of the second structure at a second time position, wherein said first and second time positions relate to each other such that the second structure reaches the active position after the first time position.

This may be advantageous as it allows transporting the banknote stack without moving the second structure for those situations where this works perfectly and efficiently. One example of such a situation is an orderly stacked banknote stack including undamaged and/or planar banknotes. For such situations, the second structure may, if moved to the active position, potentially complicate the transport process instead of aiding it, and it may therefore be more efficient to not make use of it and allow it to remain in the rest position. By allowing the second structure to arrive at the active position after starting the displacement of the first and second banknote engagement portions, the displacement operation commenced by the first and second banknote engagement portions will first have a chance to attempt transporting the banknote stack on its own. The banknote stack transport arrangement may be configured to initiate said moving of the second structure such that the second structure reaches the active position a predefined time period after the first time position. The predefined time period may be set by a user or determined by a control unit operably connected to the banknote stack transport arrangement. If the transport process is not successful within the predetermined time period, the second structure will be moved to the active position and aid with the transport.

According to some embodiments, the banknote stack transport arrangement is configured to:

initiate said displacing of the first and second banknote engagement portions at a first time position, and initiate said moving of the second structure at a second time position, wherein said first and second time positions relate to each other such that the second structure has reached the active position before the first time position.

This may be advantageous as it may provide a more reliable banknote stack transport process. By always making sure that the banknote stack is compressed between the first banknote engagement surface and the second structure, the banknote stack may be actively shaped to better allow transport out from the temporary banknote receptacle.

According to some embodiments, the banknote transport arrangement further comprises a drive unit configured to, via a drive mechanism, provide kinetic energy to the first and second structures for displacing the first and second banknote engagement portions.

According to some embodiments, the drive unit is further configured to, via the drive mechanism, move the second structure between the rest and active positions.

Providing a drive mechanism that controls both the displacement of the first and second banknote engagement portions and the movement of the second structure may simplify the banknote stack transport arrangement. Moreover, it allows for using a single drive unit for both the portion displacement and the movement of the second structure.

By the term "drive mechanism" is here meant any mechanism that connects a drive unit to one of more parts of the banknote stack transport arrangement so as to provide kinetic energy to the one or more parts in order to generate movement of the one or more parts. By way of example, the drive mechanism may comprise a plurality of different sections with individual functionality, wherein each section of the plurality of sections is connected to an individual part of the banknote stack transport arrangement. Given as non-limiting examples, the drive mechanism may comprise a section connecting the drive unit to the first structure for displacing the first banknote engagement portion, and another section connecting the drive unit to the second structure for displacing the second banknote engagement portion, wherein the two sections may be configured for displacing the first and second banknote engagement portions either synchronously or independently. Given as another non-limiting example, the drive mechanism may further comprise yet another section connecting the drive unit to the second structure for moving the second structure between the rest and active positions, wherein the yet other section may be configured for moving the second structure either synchronously with or independently from the other sections.

It should be realized that, in alternative embodiments, the drive unit may be part of a plurality of drive units. Each of the plurality of drive units may be connected to an individual section of the drive mechanism such that each drive unit may provide kinetic energy to an associated part of the banknote stack transport arrangement. Given as non-limiting examples, the first and second banknote engagement portion and the second structure may be provided with kinetic energy from individual drive units, via the drive mechanism.

According to some embodiments, the drive unit is an electric motor.

According to some embodiments, the drive mechanism is configured such that kinetic energy is provided to the first and second banknote engagement portions only for one rotational direction of the drive unit, such that said first and second banknote engagement portions are only displaceable in a direction towards the exit gap.

This may be advantageous as it removes the risk of accidentally displacing the first and second banknote engagement portions in a direction opposite to the intended direction. If the first and second banknote engagement portions suddenly were to be displaced in the opposite direction, the banknote stack may break up into individual banknotes inside the temporary banknote receptacle, increasing the risk of jam. Furthermore, for these embodiments, the drive unit may be allowed to operate along both rotational directions without risking causing displacement in the opposite direction. One way to configure the drive mechanism such that kinetic energy is provided to the first and second banknote engagement portions only for one rotational direction of the drive unit is by using one or more one-way clutch bearings in the drive mechanism. Such clutch bearings will transfer kinetic energy supplied to the clutch bearing along a predefined rotational direction whereas it will not transfer any kinetic energy supplied to the clutch bearing along a rotational direction being opposite to the predefined rotational direction.

According to some embodiments, the drive unit is configured to be operated along a forward rotational direction for moving the second structure from the rest position to the active position, and a reverse rotational direction for moving the second structure from the active position to the rest position. The drive mechanism may be configured such that the drive unit operates in the forward direction when the second structure is located in the active position. This may be achieved by using one or more slip clutches or torque limiters in the drive mechanism. Such components allow mechanical coupling between the drive unit and the second structure as long as the torque supplied by the drive unit does not exceed a maximum threshold value. If the torque exceeds the maximum threshold value, the component either mechanically uncouples the drive mechanism from the second structure or limits the torque by slipping. For the example embodiments, the latter alternative is preferably used. In other words, the drive mechanism may be configured to exert a torque to the second structure when the second structure is in the active position and the drive unit is operated in the forward direction. This achieves the effect that the second structure may press the banknote stack towards the first banknote engagement portion.

According to some embodiments, the banknote transport arrangement further comprises a banknote stacking wheel configured to receive the one or more banknotes, move the one or more banknotes into the temporary banknote receptacle, and form a banknote stack therein.

According to a second aspect there is provided a cash handling machine comprising:

- a banknote input unit for allowing a user to input one or more banknotes;
- a safe for storing the one or more banknotes; and
- a banknote stack transport arrangement according to the first aspect; wherein the banknote transport arrangement is configured to receive the one or more banknotes and transport the same into the safe.

According to a third aspect there is provided a method for transporting one or more banknotes inside a cash handling machine, wherein the cash handling machine comprises:

- a first structure having first and second ends and presenting a first banknote engagement portion being displaceable in relation to the first structure;
- a second structure having first and second ends and presenting a second banknote engagement portion being displaceable in relation to the second structure;
- wherein the first structure is pivotally arranged at its first end so as to be swingably movable, and wherein the second structure is pivotally arranged at its second end so as to be swingably movable, the method comprising:
- receiving, when the first structure is in a closed configuration at which the first and second structures are distanced from each other at the first associated ends for allowing one or more banknotes to enter in between the same, and at which the first and second banknote engagement portions are in contact with each other at the second associated ends so as to form at least a bottom part of a temporary banknote receptacle, one or more banknotes in the temporary banknote receptacle and supporting a formation of a banknote stack therein such that the first banknote engagement portion contacts a face side of the banknote stack and the second banknote engagement portion contacts an edge side of the banknote stack;
- moving the second structure of the cash handling machine to an active position at which the second structure is configured to press the banknote stack towards the first banknote engagement portion, and
- displacing the first and second banknote engagement portions in relation to the first and second structures so as to transport, when the first structure is in an open configuration at which the first and second banknote engagement portions are separated from each other at the second associated ends so as to define an exit gap, the banknote stack out from the temporary banknote receptacle via the exit gap.

According to some embodiments, said step of displacing the first and second banknote engagement portions is initiated at a first time position, and wherein the step of moving the second structure is initiated at a second time position, and

- wherein the first and second time positions relate to each other such that the second structure has reached the active position before the first time position.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles “a”, “an”, “the”, and “said” are intended to mean that there are one or more of the elements unless the context clearly dictates otherwise. Thus, for example, reference to “a unit” or “the unit” may include several devices, and the like. Furthermore, the words “comprising”, “including”, “containing” and similar wordings does not exclude other elements or steps.

BRIEF DESCRIPTIONS OF THE DRAWINGS

The disclosure will by way of example be described in more detail with reference to the appended drawings, which shows presently preferred embodiments of the disclosure.

FIG. 1 is a perspective view of parts of a banknote stack transport arrangement according to an embodiment of the present disclosure.

FIGS. 2A-F are side views of the banknote stack transport arrangement of FIG. 1 at different time positions of a banknote transport process.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person.

Figure 1:
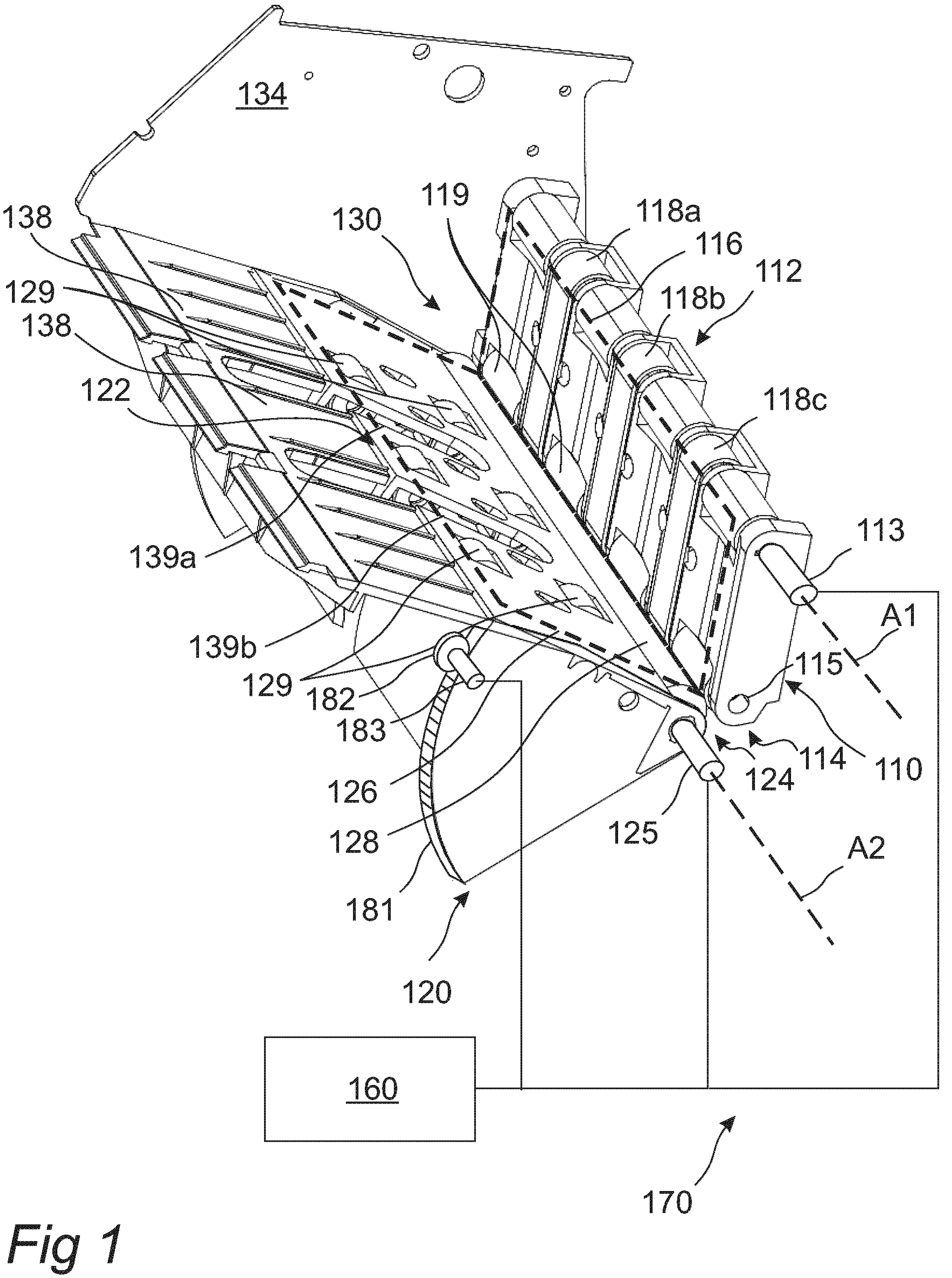

FIG. 1 shows a banknote stack transport arrangement 100 according to an example embodiment. The banknote stack transport arrangement 100 is typically used inside a cash handling machine of the kind handling large amounts of banknotes. The banknote stack transport arrangement 100 may be specifically advantageous to use within a cash handling machine used for depositing cash. Such a machine will be further described later.

The banknote stack transport arrangement 100 will here first be described with reference to FIG. 1 in terms of its structural features, whereas its function will be described more in detail later with references to FIGS. 2A to F. That said, FIGS. 2A-F may also be used to identify at least some of the structural features of the arrangement, and therefore FIGS. 1 and 2 may preferably be viewed in combination.

As illustrated in FIGS. 1 and 2A to F, the banknote stack transport arrangement 100 comprises a first structure 110 having first 112 and second 114 ends. The first structure 110 comprises a first shaft 113 arranged at the first end 112 and a second shaft 115 arranged at the second end 114. The first shaft 113 is rotationally arranged in the first structure 110. One or more conveyor belts 118*a-c* extend between the first 113 and second 115 shafts. In the example embodiment, three conveyor belts are used. Conveyor belt 118*b* is located in the central part of the first structure 110, whereas conveyor belts 118*a* and 118*c* are located in vicinity of side walls 134 which interconnects the first 110 and second 120 structures. Four rollers 119 are also arranged at the second end 114 alternatingly disposed with the conveyor belts 118*a-c*. The rollers 119 are arranged on the same shaft as the conveyor belts 118*a-c*, namely the shaft 115 and is actively rotated with the shaft 115. The rollers 119 and the conveyor belts 118*a-c* act together to increase the total contact area available at the second end 114 of the first structure 110. This is beneficial when transporting the banknote stack 30 as it increases the grip. In FIG. 1 only one of the side walls 134 are illustrated to make it possible to see the interior of the arrangement. The side walls 134 has also been removed in FIGS. 2A-E for the same reason.

Figure 2A:
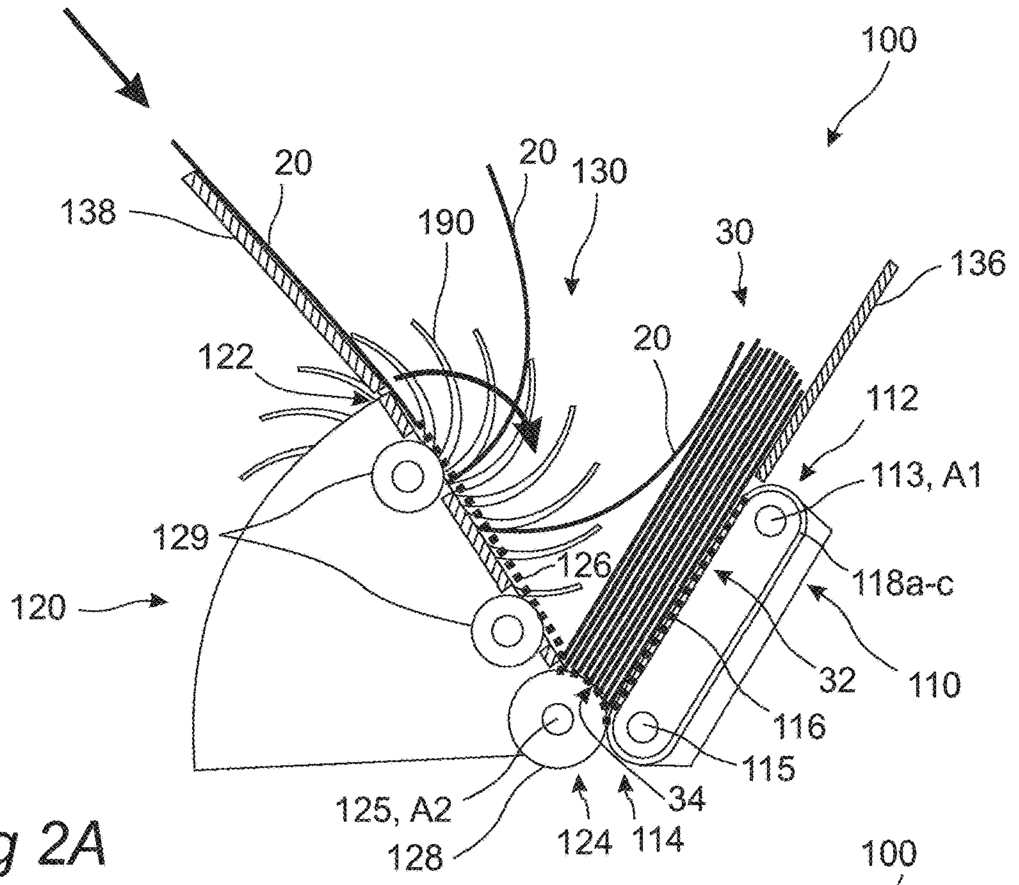
Figure 2B:
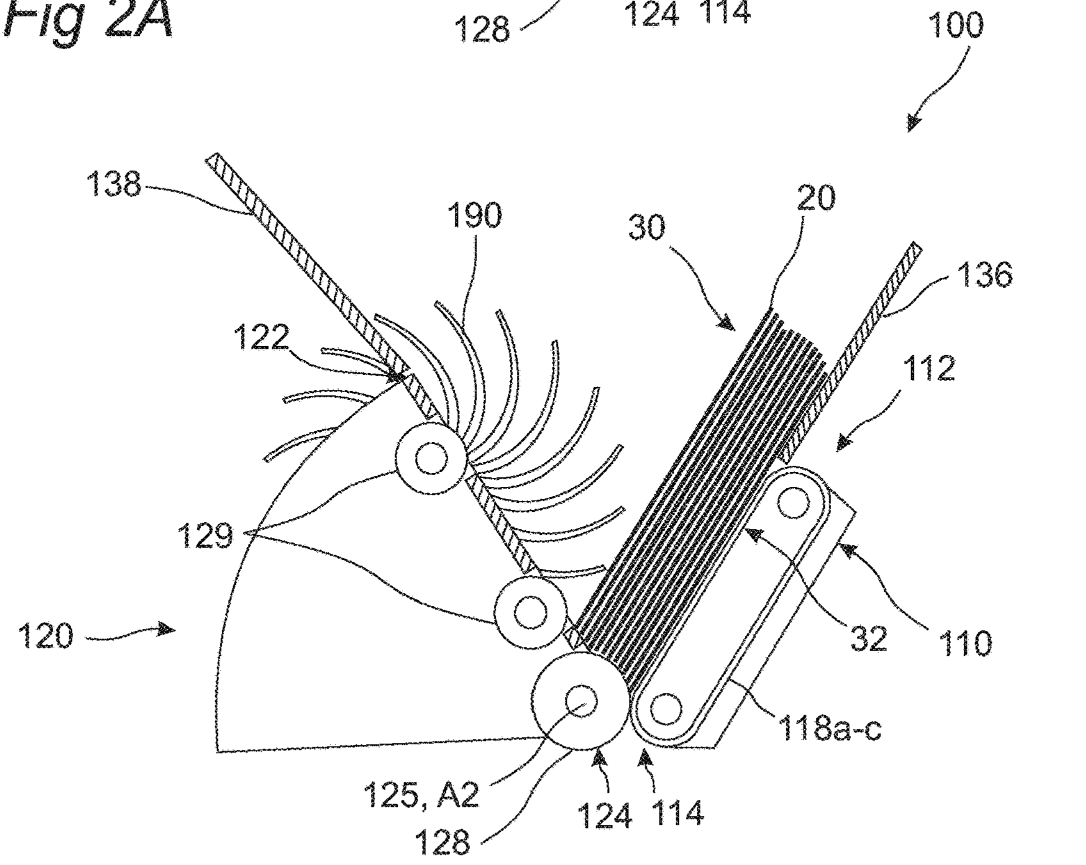
Figure 2C:
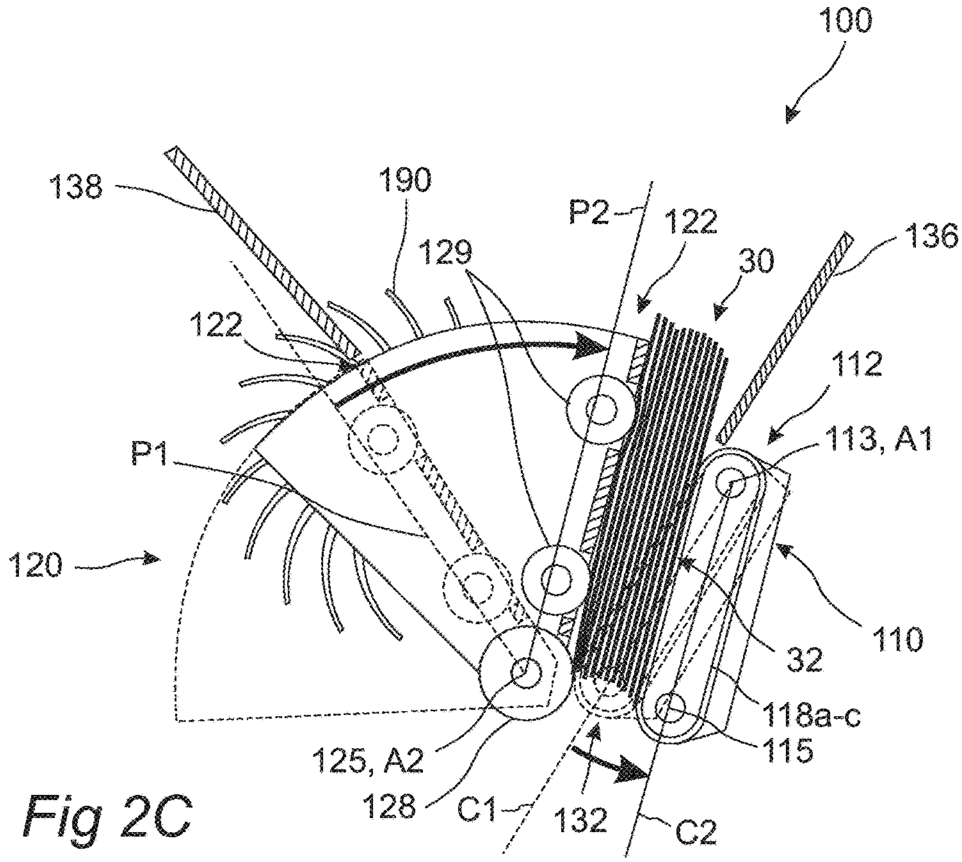

The one or more conveyor belts 118*a-c* together presents a first banknote engagement portion 116 which is displaceable in relation to the first structure 110. The purpose of the first banknote engagement portion 116 is to provide support for a banknote stack 30 as will be described more in detail later. The first structure 110 is pivotally arranged at its first end 112 so as to be swingably movable around pivot axis A1 (see FIGS. 1 and 2C). The first structure 110 is movable between a closed configuration C1 and an open configuration C2, as illustrated in FIG. 2C. In the closed configuration C1, the first 116 and second 126 banknote engagement portions are in contact with each other at the second associated ends 114, 124 such that they together form a bottom part of a temporary banknote receptacle 130. The first 110 structure is biased towards the second structure 120 to the closed configuration C1. In the example embodiment the biasing is achieved by means of a coil spring (not shown) arranged at the pivot axis A1. As will be further described later, the temporary banknote receptacle 130 is configured to receive one or more banknotes 20 and support a formation of a banknote stack 30 therein.

The banknote stack transport arrangement 100 further comprises a second structure 120 having first 122 and second 124 ends. The second structure 120 comprises a shaft

125 arranged at the second end 124. The shaft 125 is rotationally arranged in the second structure 120. The second structure 120 is pivotally arranged at its second end 124 so as to be swingably movable around pivot axis A2 (see FIGS. 1 and 2C). As illustrated in FIG. 1, the shaft 125 defines the axis A2. Thus, the second structure 120 is connected to side walls 134 of the arrangement 100 by means of the shaft 125. The shaft 125 also connects with a main roller 128 which extends between the side walls 124. The main roller 128 may be selectively rotated by means of a drive mechanism 170 connected to a drive unit 160 as will be described in detail later. The second structure further comprises a plurality of support rollers 129 (in the example embodiment: 6 support rollers 129) located between the main roller 128 and the first end 122. The support rollers are passive, i.e. they are not connected to a drive mechanism. For the example embodiment, the main roller 128 and the passive rollers 129 together define a second banknote engagement portion 126 which is displaceable in relation to the second structure 120. The second banknote engagement portion 126 is defined by the outer enveloped surfaces of the main roller 128 and the plurality of passive rollers 129 that faces the interior of the temporary banknote receptacle 130. This is illustrated in FIG. 1 and FIG. 2A by dashed lines.

The purpose of the second banknote engagement portion 126 is to provide support for a banknote stack 30 as will be described in more detail later. The first 110 and second 120 structures are arranged such that said first 116 and second 126 banknote engagement portions are distanced from each other at the first associated ends 112, 122 for allowing one or more banknotes 20 to enter in between the banknote engagement portions 116, 126. The second structure 120 is pivotably arranged to be swingable around axis A2. Thus, as appreciated by the person skilled in the art, the second banknote engagement portion 126 may be rotationally shifted in relation to the first banknote engagement portion 116. However, since the main roller 128 rotates around the axis A2, the relative position of the main roller 128 is unaffected by the movement of the second structure 120 about axis A2. The significance of this will be described later. The second structure 120 is actively moved between the rest position P1 and the active position P2. In the example embodiment, this is achieved by a rack and pinion drive consisting of rack 181 which is engaged by gear 182 which is attached to shaft 183. However, note that the rack and pinion drive is only one of several ways of providing the movement for the second structure. Given as a non-limiting example, movement of the second structure may alternatively be provided by means of a linear actuator, such as e.g. a pneumatic actuator.

The banknote stack transport arrangement 100 further comprises a drive unit 160 configured to, via a drive mechanism 170, provide kinetic energy to the first 110 and second 120 structures for displacing the first 116 and second 126 banknote engagement portions. As schematically illustrated in FIG. 1, the drive mechanism 170 connect the drive unit 160 with shaft 113 for rotating the conveyors 118*a-c*, the shaft 125 for rotating the main roller 128, and to shaft 183 for moving the second structure 120 between the rest position P1 and the active position P2. The drive unit 160 and the drive mechanism 170 are only briefly described herein and schematically illustrated in FIG. 1. There are many alternative means known in the art on how to provide such drive units and drive mechanism, and they are therefore not detailed herein. The disclosed arrangement is also merely an example. For example, it is also conceivable to provide more than one drive unit, or even individual drive units and/or drive mechanisms for each shaft.

As can be seen in FIGS. 1 and 2, the temporary banknote receptacle 130 of the example embodiment extends beyond the first 110 and second 120 structures and is consequently defined by further features. These include already mentioned side walls 134, first upper support structure 136 (see FIG. 2) and second upper support structure 138 (FIGS. 1 and 2). The second upper support structure 138 and the second structure 120 together presents two elongate openings 139*a*, 139*b* through which a banknote stacking wheel 190 protrudes from below. The banknote stacking wheel 190 (see FIG. 2A) is configured to receive one or more banknotes 20, move the one or more banknotes 20 into the temporary banknote receptacle 130 and form a banknote stack 30 therein.

Having described the structural features of the banknote stack transport arrangement 100 in detail with reference to FIGS. 1 and 2, it is now time to describe how the banknote stack transport arrangement 100 handles a transport of a banknote stack 30. This will be done with reference to FIGS. 2A to F which illustrates the banknote stack transport arrangement 100 in different phases of the transport process.

FIG. 2A illustrates a stacking process of banknotes 20 in the temporary banknote receptacle 130 of the banknote stack transport arrangement 100. The stacking process starts with a step of rotating the banknote stacking wheel 190 in a clockwise direction while individual banknotes 20 are supplied to the banknote stacking wheel 190. Supplying individual banknotes to banknote stacking wheels are well known in the art, one common approach being based on a pair of oppositely arranged conveyor belts which presses individual banknotes in between them and transport the individual notes between two positions within a cash handling machine. Gradually, a banknote stack 30 is formed within the temporary banknote receptacle 130. The banknote stack 30 is formed such that the first banknote engagement portion 116 contacts a face side 32 of the banknote stack 30 and the second banknote engagement portion 126 contacts an edge side 34 of the banknote stack 30. In FIG. 2B the banknote stack 30 has been formed and the banknote stack transport arrangement 100 is ready to transport the banknote stack 30 out from the temporary banknote receptacle 130.

The banknote stack transport process will now be described with reference to FIGS. 2C-F. When the banknote stack 30 has been formed in the temporary banknote receptacle 130 (FIG. 2B), the banknote stack transport arrangement 100 is ready to transport the banknote stack 30. Typically, the banknote stack 30 is to be transported from the banknote stack transport arrangement 100 to a cash storage compartment located under the banknote stack transport arrangement 100. As will be discussed later, such a compartment may be a safe, i.e. a locked and secured storage compartment. The banknote transport process is typically initiated in response to a signal reaching the banknote stack transport arrangement 100 from a control unit of the cash handling machine of which the arrangement 100 is part.

The signal triggers the drive unit 160 to start moving the second structure 120 from the rest position P1 towards the active position P2. In FIG. 2C, the dotted lines illustrate the position of the second structure 120 in the rest position P1 and the solid lines when it has been moved to the active position P2 along the indicated arrow. During this movement, the second structure 120, and more particularly the second banknote engagement portion 126, will make contact with the banknote stack 30 at the second end 124. This will exert a pressure onto the banknote stack 30 which will be transferred to the first banknote engagement portion 116 on the opposite side of the banknote stack 30, hence causing the first structure, which is biased towards the closed configuration C1 to start moving outwardly towards the open configuration C2. In the open configuration C2, the first structure 110 has been swingably moved about the pivot axis A1 such that the first 116 and second 126 banknote engagement portions are separated from each other at the second associated ends 112, 122 so as to define an exit gap 132. In FIG. 2C, the dotted lines illustrate the position of the structure 110 in the closed configuration C1 and the solid lines when it has been moved to the open configuration C2 along the indicated arrow. When the second structure 120 has reached the active position P2, the first and second banknote engagement portions 116, 126 are substantially parallel with each other and sandwiching the banknote stack 30 between them.

Figure 2D:
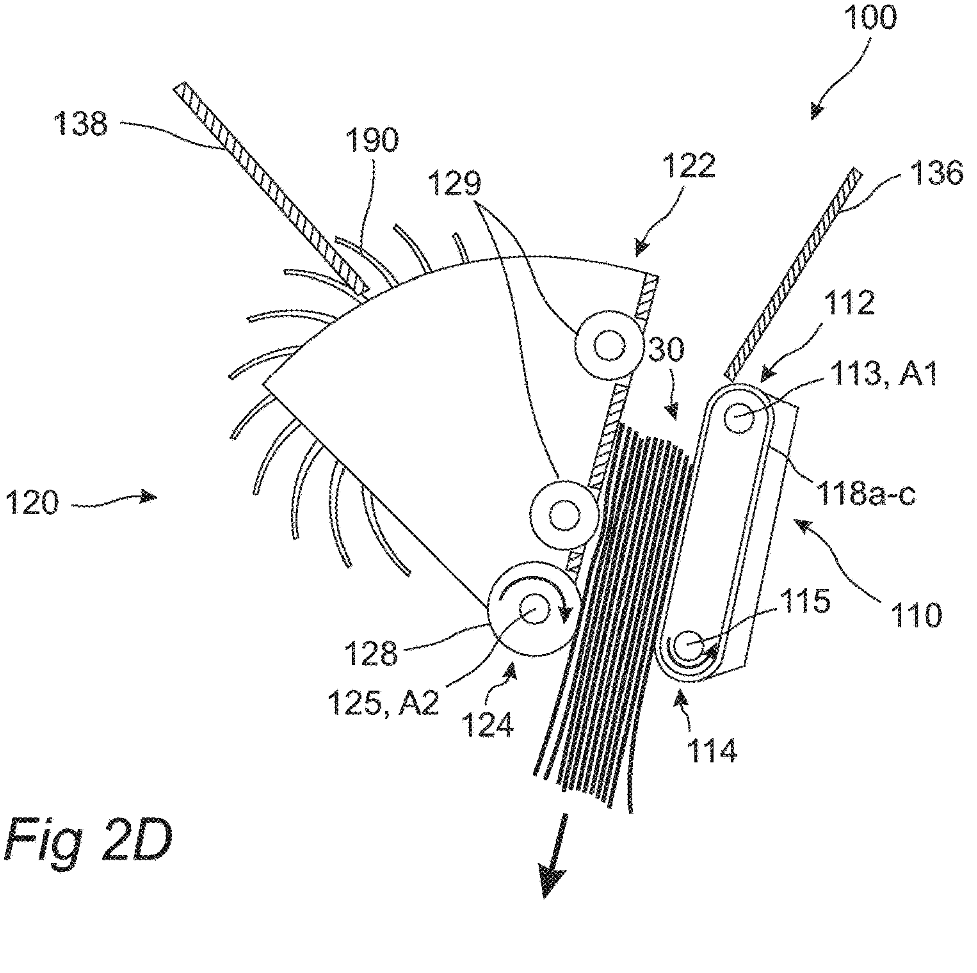

As a next step, displacement of the conveyor belts 118*a-c* and the main roller 128 will be initiated in counter-rotating fashion to provide a displacement in a direction towards the second associated ends 114, 124. The banknote stack 30, which resides in the temporary banknote receptacle 130, will then be forced downwards. During this movement, the first structure 110 will adapt its position if needed. The banknote stack 30 now resides in between the first 116 and second 126 banknote engagement portions and are pressed in between them at the second associated ends 114, 124, and upwardly towards the upper end of the banknote stack 30. As the first 116 and second 126 banknote engagement portions continues to be displaced, the banknote stack 30 will continue its transport process out through the exit gap 132, as illustrated in FIGS. 2D and E. Once the banknote stack 30 has been transported through the exit gap 132 and left the banknote transport arrangement 100, the first structure 110 will, by means of its biasing, move back from the open configuration C2 to the closed configuration C1, thereby re-establishing contact between the first 116 and second 126 banknote engagement portions (see FIG. 2F). At this stage, the temporary banknote receptacle 130 is completely emptied. The last step before being able to receive new banknotes is to move the second structure 120 back to its rest position P1 (step not shown).

Figure 2E:
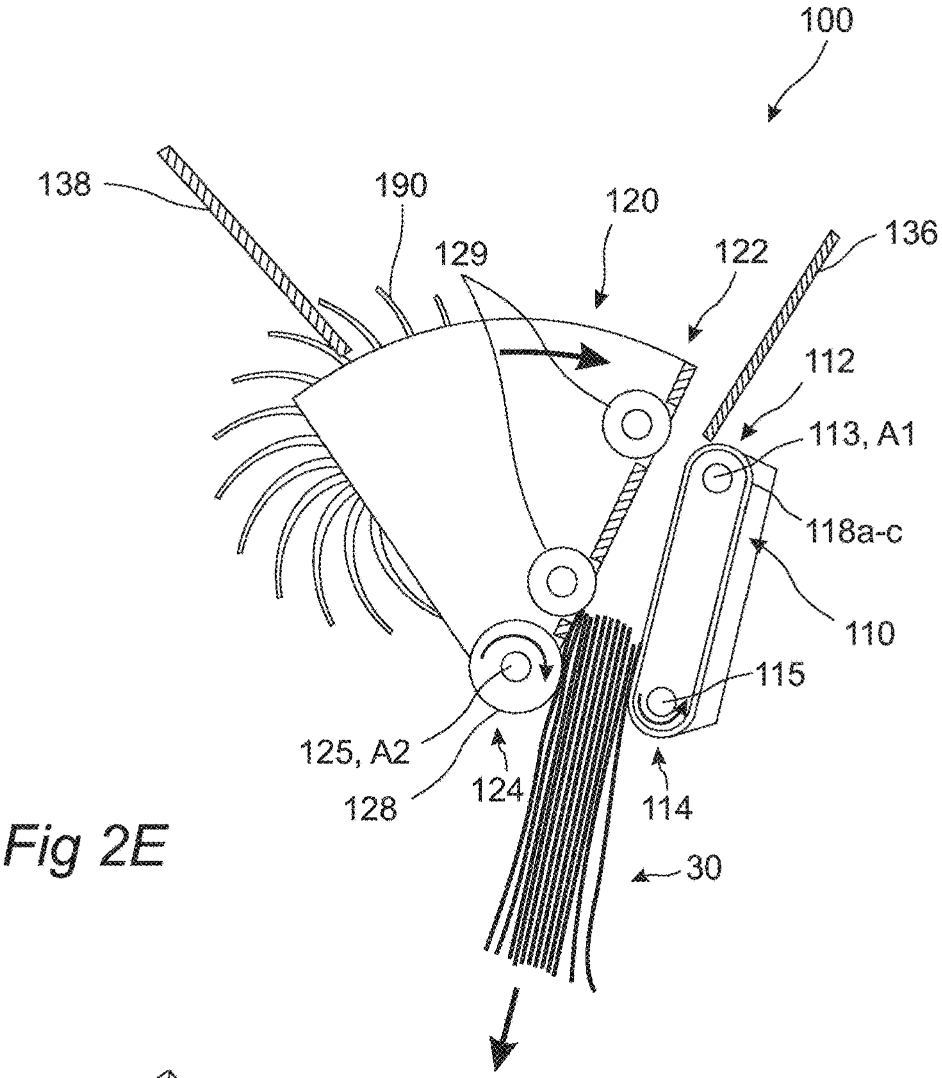
Figure 2F:
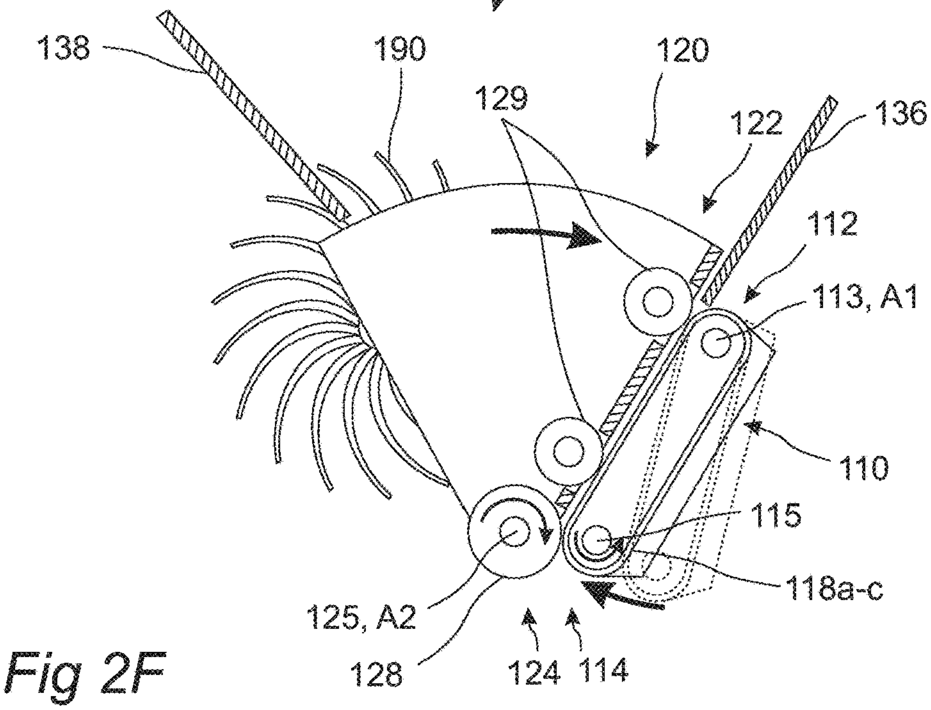

As readily appreciated by the person skilled in the art the active position P2 is not static. Instead, the active position P2 will depend on the thickness of the banknote stack 30 as well as the relative position of the banknote stack 30 in relation to the banknote transport arrangement 100 during the banknote stack transport process. This is illustrated in FIGS. 2E and F. As the banknote stack is transported through the exit gap 132, the second structure 120 will be able to move further in the direction towards the first structure 110. As the banknote stack 30 has left the transport arrangement 100, the second structure 120 will be in abutment with the first structure (FIG. 2F). This is however merely one of several alternative ways of operating a banknote stack transport arrangement of the invention and should by no means be regarded as limiting. In other embodiments, the second structure may be moved from the active position P2 to the rest position P1 earlier, for example when the banknote stack is about half transported through the exit gap 132.

The second structure 120 is actively moved from the rest position P1 to the active position P2. As previously mentioned, this may be done using a drive unit 160 and drive mechanism 170. To allow the second structure to exert the appropriate pressure on the banknote stack, active control systems may be used based on e.g. sensor readings of pressure and/or the position of the second structure in relation to the banknote stack 30. It is also conceivable to provide the mechanism with a biasing. In one example embodiment, the rack and pinion drive is only used to move the second structure to a particular angular position. From there, the second structure may continue to move angularly in relation to the banknote stack 30 during the transport by being biased towards the banknote stack 30, e.g. by the drive mechanism being spring-loaded. Alternatively, the second structure 120 may be pressed towards the banknote stack 30 by providing one or more slip clutches in the drive mechanism 170 and allow the drive unit 160 to operate also after the second structure 120 has reached the active position P2 and thus made contact with the banknote stack 30.

As can be understood by the person skilled in the art, the banknote stack transport arrangement 100 of the disclosure hence is configured to transport the banknote stack 30 out from the temporary banknote receptacle 130 via the exit gap 132 by displacing said first 116 and second 126 banknote engagement portions in relation to said first 110 and second 120 structures and by moving the second structure 120 to the active position P2. As readily appreciated by the person skilled in the art, displacing the first 116 and second 126 banknote engagement portions in relation to the first 110 and second 120 structures may be sufficient to transport the banknote stack 30 out from the temporary banknote receptacle 130. The displacement will force the banknote stack 30 towards a bottom of the temporary banknote receptacle 130 (i.e. at the second associated ends 114, 124 of the first 110 and second 120 structures). The force from the banknote stack 30 will force the first 110 structure to distance itself from the second structure 120 from at their second associated ends 114, 124, thereby forming the exit gap 132 for allowing the banknote stack 30 to leave the temporary banknote receptacle 130. Thus, there may be occasions where the banknote stack transport arrangement 100 does not make use of the extra help provided by moving the second structure 120.

There may however be situations where the displacement of the first and second banknote engagement portions 116, 126 is not enough for transporting the banknote stack 30 out from the temporary banknote receptacle 130. Typically, such situations occur when the banknote stack 30 includes few banknotes 20 and/or the banknotes 20 of the stack 30 are not correctly aligned in the temporary banknote receptacle 130, and/or one or more banknotes 20 of the banknote stack 30 are damaged e.g. by folds, tears, holes and foil wear. For such situations, moving the second structure 120 to the active position P2 may aid in the transport process by pressing the banknote stack 30 towards the first banknote engagement portion 116, thereby reducing the risk that one or more banknotes of the banknote stack 30 are prevented from being transported out from the temporary banknote receptacle 130.

Figure 3A:
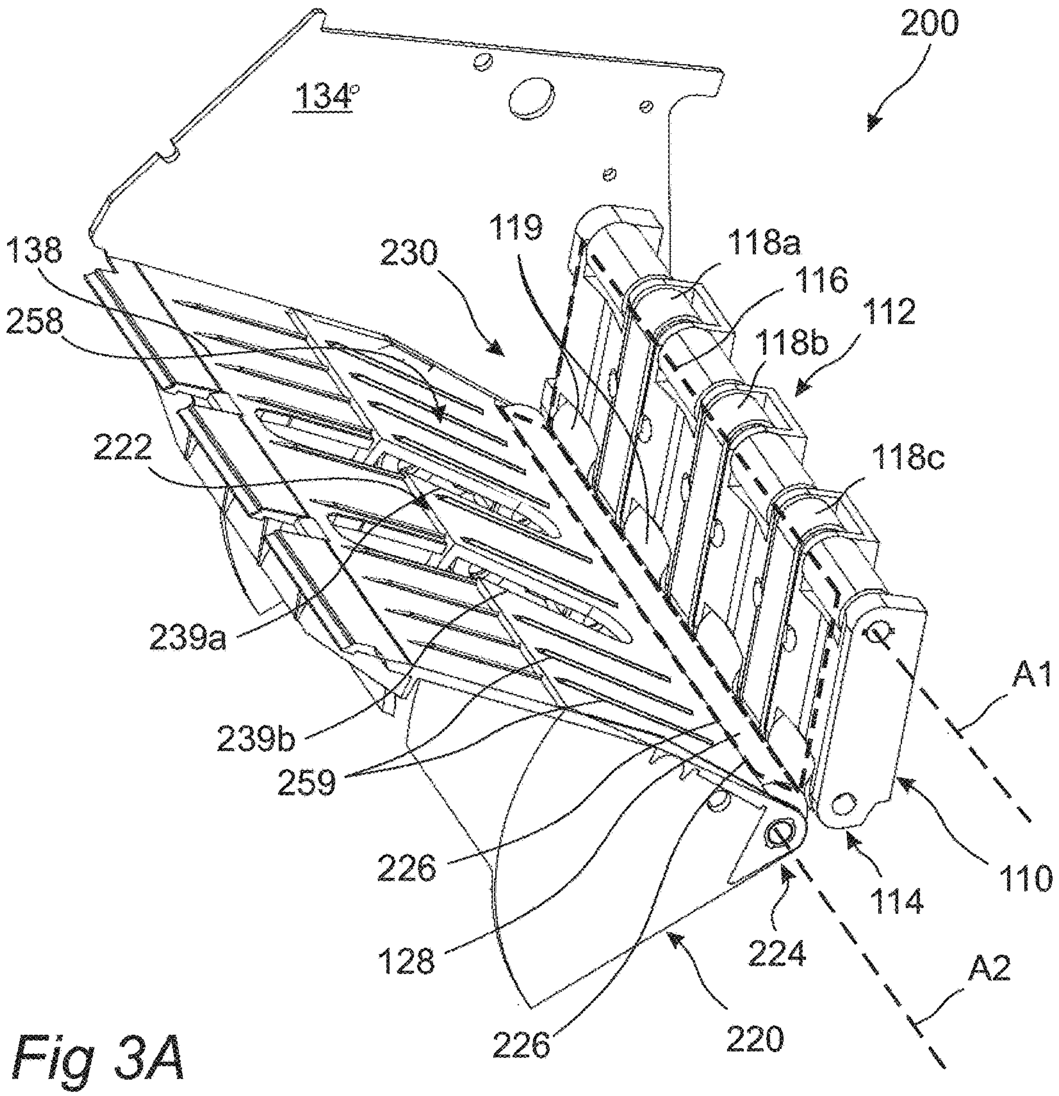
FIG. 3A is a perspective view of parts of a banknote stack transport arrangement according to another embodiment of the present disclosure.
Figure 3B:
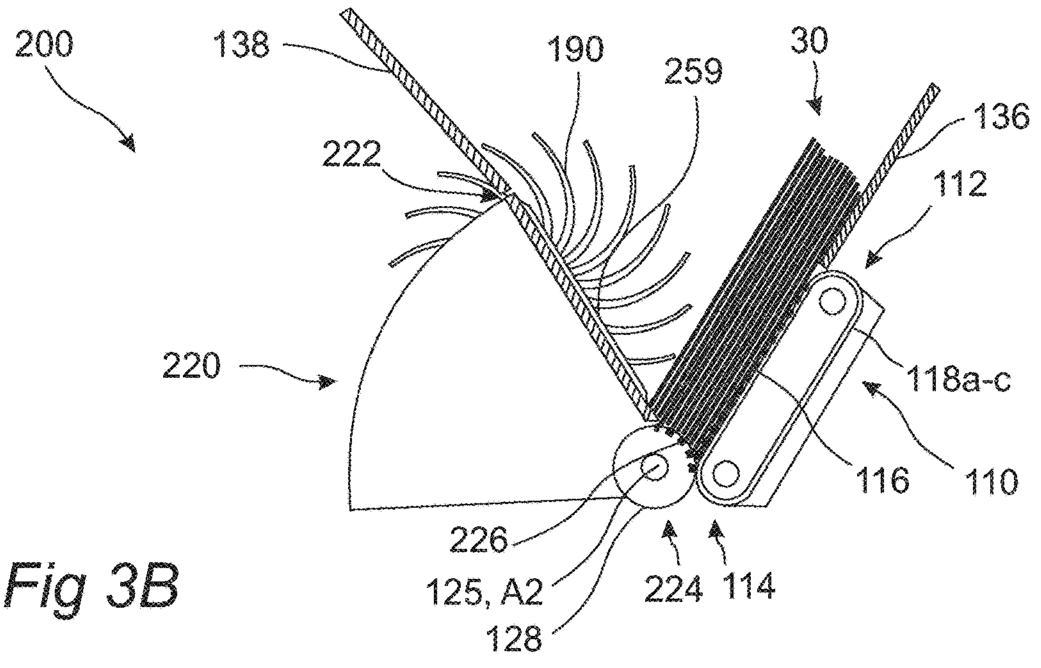
FIG. 3B is a side view of the banknote stack transport arrangement of FIG. 3A.

FIGS. 3A and B illustrate a banknote transport arrangement 200 according to an alternative embodiment. The banknote transport arrangement 200 differs from the banknote transport arrangement 100 only in the design of the second structure 220. As can be seen in FIGS. 3A and B, the banknote stack transport arrangement 200 lacks supporting rollers. Instead, the second banknote engagement portion 226 will be solely defined by the enveloped surface of the main roller 128 which faces the temporary banknote receptacle 230. Thus, the second structure 220 will have its banknote engagement portion located at its second end 224. The second structure 220 further presents a banknote engaging surface 258 disposed between the second banknote engagement portion 226 and the first end 222 of the second structure 220. The second structure 220 is configured to, in the active position P2, press the banknote stack 30 towards the first banknote engagement portion 116 by means of both the second banknote engagement portion 226 and the banknote engaging surface 258. To reduce frictional forces between the banknote engaging surface 258 and the transported banknote stack 30, the banknote engaging surface 258 is provided with a plurality of fins 259.

Figure 4:
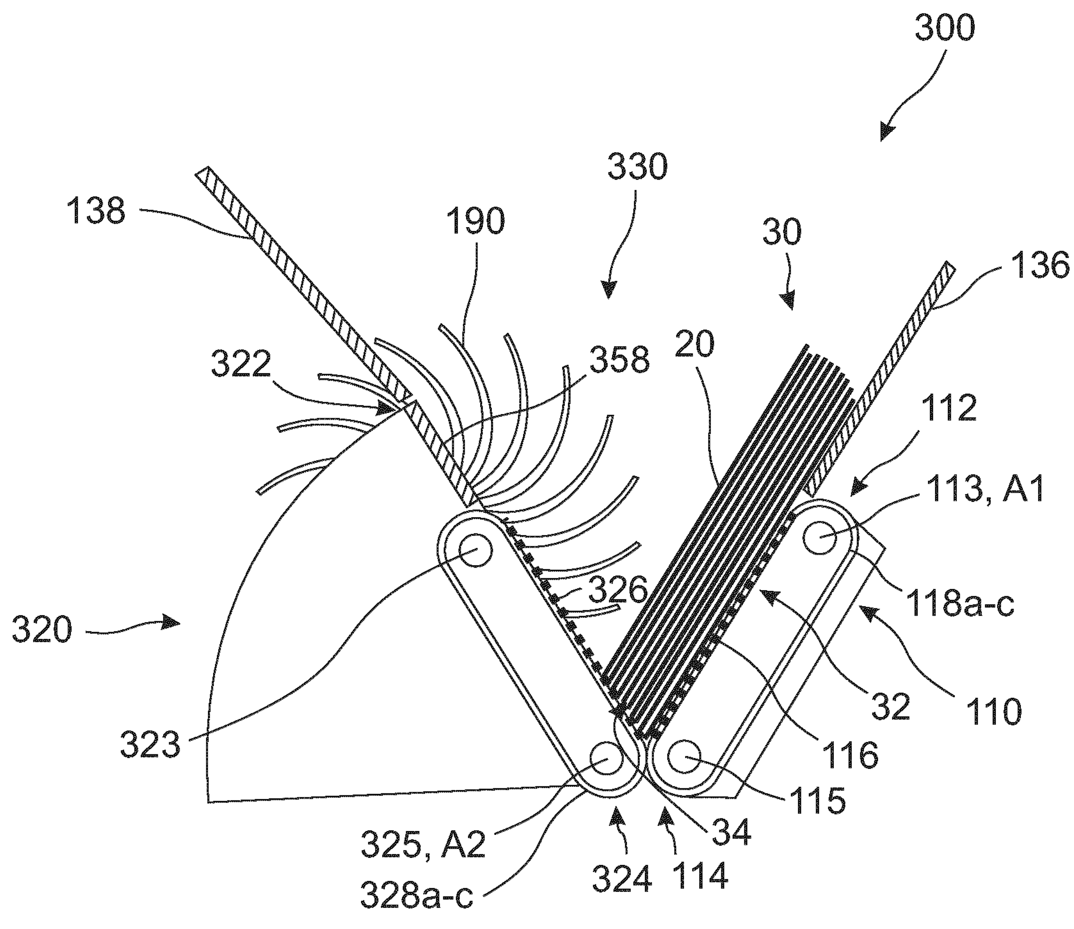
FIG. 4 is a side view of parts of a banknote stack transport arrangement according to another embodiment of the present disclosure.

FIG. 4 illustrates a banknote transport arrangement 300 according to an alternative embodiment. The banknote transport arrangement 300 differs from the banknote transport arrangements 100, 200 only in the design of the second structure 320. The second structure comprises first 322 and second 324 ends. The second structure 320 further comprises a first shaft 323 arranged between the first end 322 and the second end 324, and a second shaft 325 arranged at the second end 324. Although not illustrated here, it is conceivable that the first shaft 323 may alternatively be arranged at the first end 322. As illustrated in FIG. 4, the second structure 320 comprises one or more conveyor belts 328*a-c* that extend between the first 323 and second 325 shafts. Although FIG. 4 merely illustrates a side view of the banknote transport arrangement 300, it should be realized that the conveyor belts 328*a-c* may have a similar appearance as the conveyor belts 118*a-c* illustrated in FIG. 1. Additionally, the second structure may optionally comprise rollers (not shown) arranged at the second end 324 alternatingly disposed with the conveyor belts 328*a-c*, similar to the rollers 119 of the first structure 110.

The one or more conveyor belts 328*a-c* together presents a second banknote engagement portion 326. Thus, in the present embodiment the second banknote engagement portion 326 may extend only partly from the second end 324 towards, but not all the way to, the first end 322. In other words, the second structure 320 may have its banknote engagement portion 326 located from its second end 324 to the first shaft 323. The second structure 320 further presents a banknote engaging surface 358 disposed between the second banknote engagement portion 326 and the first end 322 of the second structure 320. In the closed configuration C1, the first 116 and second 326 banknote engagement portions are in contact with each other at the second associated ends 114, 324 such that they together form a bottom part of a temporary banknote receptacle 330.

The second structure 320 is configured to, in the active position P2, press the banknote stack 30 towards the first banknote engagement portion 116 by means of both the second banknote engagement portion 326 and the banknote engaging surface 358.

Figure 5:
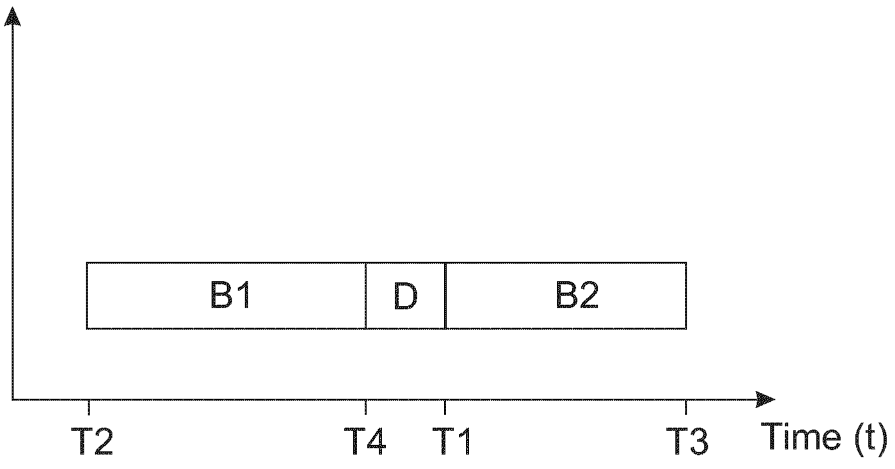
FIG. 5 shows a timing diagram illustrating the initiation of the displacing of the first and second banknote engagement portions in relation to the initiation of the moving of the second structure according to an example embodiment.

In some example embodiments of the arrangement the second structure 120, 220, 320 reaches the active position P2 before the displacement of the first 116 and second 126, 226, 326 banknote engagement portions has been initiated. This is illustrated in the timing diagram of FIG. 5. The banknote stack transport arrangement 100, 200, 300 is configured to initiate the displacing of the first 116 and second 126, 226, 326 banknote engagement portions at a first time position T1, and initiate said moving of the second structure 120, 220, 320 at a second time position T2. The first T1 and second T2 time positions relate to each other such that the second structure 120, 220, 320 has reached the active position P2 before the first time position T1. As can be seen in FIG. 5, the first 116 and second 126, 226, 326 banknote engagement portions are displacing from the first time position T1 until a third time position T3. This is illustrated in FIG. 5 by time block B2. The second structure 120, 220, 320 will start its movement from the rest position P1 towards the active position P2 at the second time position T2 but will not reach the active position P2 until a fourth time position T4. This time period of movement is illustrated in FIG. 5 by time block B1. The second structure 120, 220, 320 will then remain in the active position P2 as long as the drive unit 160 operates the banknote stack transport arrangement 100, 200, 300. This lasts until the third time position T3. It may be beneficial to allow the second structure 120, 220, 320 to make contact with the banknote stack 30 before initiating the displacement of the of the first 116 and second 126, 226, 326 banknote engagement portions. Therefore, the time position T4 is preferably before the time period T1, illustrated in FIG. 5 as the time period D.

Figure 6:
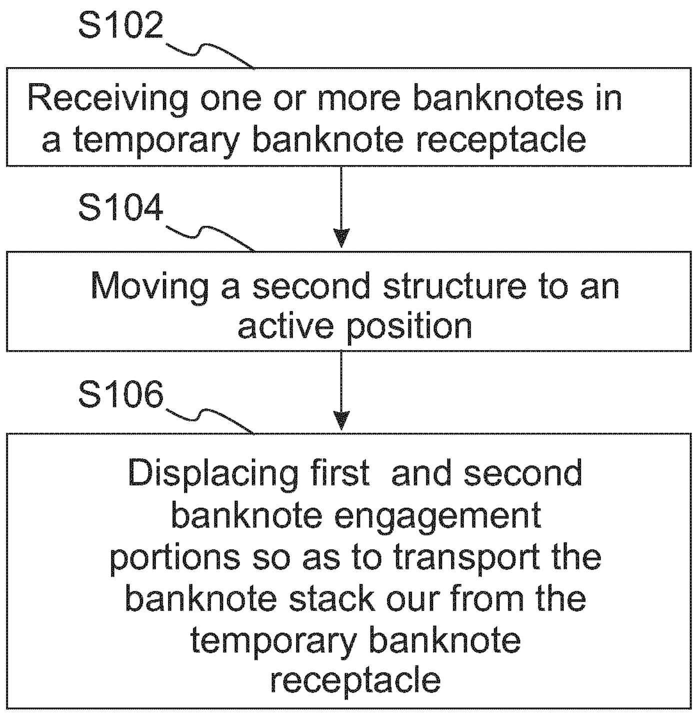
FIG. 6 shows a flow chart of a method according to an example embodiment of the disclosure.

A method for transporting one or more banknotes inside a cash handling machine 10 will now be described with reference to FIG. 6. Much of the details has already been described in detail hereinabove and the method will thus be described only in brief.

The cash handling machine 10 comprises a first structure 110 having first 112 and second 114 ends and presenting a first banknote engagement portion 116 being displaceable in relation to the first structure 110; a second structure 120, 220, 320 having first 122, 222, 322 and second 124, 224, 324 ends and presenting a second banknote engagement portion 126, 226, 326 being displaceable in relation to the second structure 120, 220, 320; wherein the first structure 110 is pivotally arranged at its first end 112 so as to be swingably movable, and wherein the second structure 120, 220, 320 is pivotally arranged at its second end 124, 224, 324 so as to be swingably movable.

The method comprises the step of receiving S102, when the first structure 110 is in a closed configuration C1 at which the first and second structures are distanced from each other at the first associated ends 112; 122, 222, 322 for allowing one or more banknotes 20 to enter in between the same, and at which the first 116 and second 126, 226, 326 banknote engagement portions are in contact with each other at the second associated ends 114; 124, 224, 324 so as to form at least a bottom part of a temporary banknote receptacle 130, 230, 330, one or more banknotes 20 in the temporary banknote receptacle and supporting a formation of a banknote stack 30 therein such that the first banknote engagement portion 116 contacts a face side 32 of the banknote stack 30 and the second banknote engagement portion 126, 226, 326 contacts an edge side 34 of the banknote stack 30.

The method further comprises the step of moving S104 the second structure 120, 220, 320 of the cash handling machine 10 to an active position P2 at which the second structure 120, 220, 320 is configured to press the banknote stack towards the first banknote engagement portion 116.

The method further comprises the step of displacing S106 the first 116 and second 126, 226, 326 banknote engagement portions in relation to the first 110 and second 120, 220, 320 structures so as to transport, when the first structure 110 is in an open configuration C2 at which the first 116 and second 126, 226, 326 banknote engagement portions are separated from each other at the second associated ends 114; 124, 224, 324 so as to define an exit gap 132, the banknote stack 30 out from the temporary banknote receptacle 130, 230, 330 via the exit gap 132.

According to one example embodiment of the method, the step of displacing the first 116 and second 126, 226, 326 banknote engagement portions is initiated at a first time position T1, and the step of moving the second structure 120, 220, 320 is initiated at a second time position T2, and wherein the first and second time positions relate to each other such that the second structure 110 has reached the active position P2 before the first time position T1.

Figure 7A:
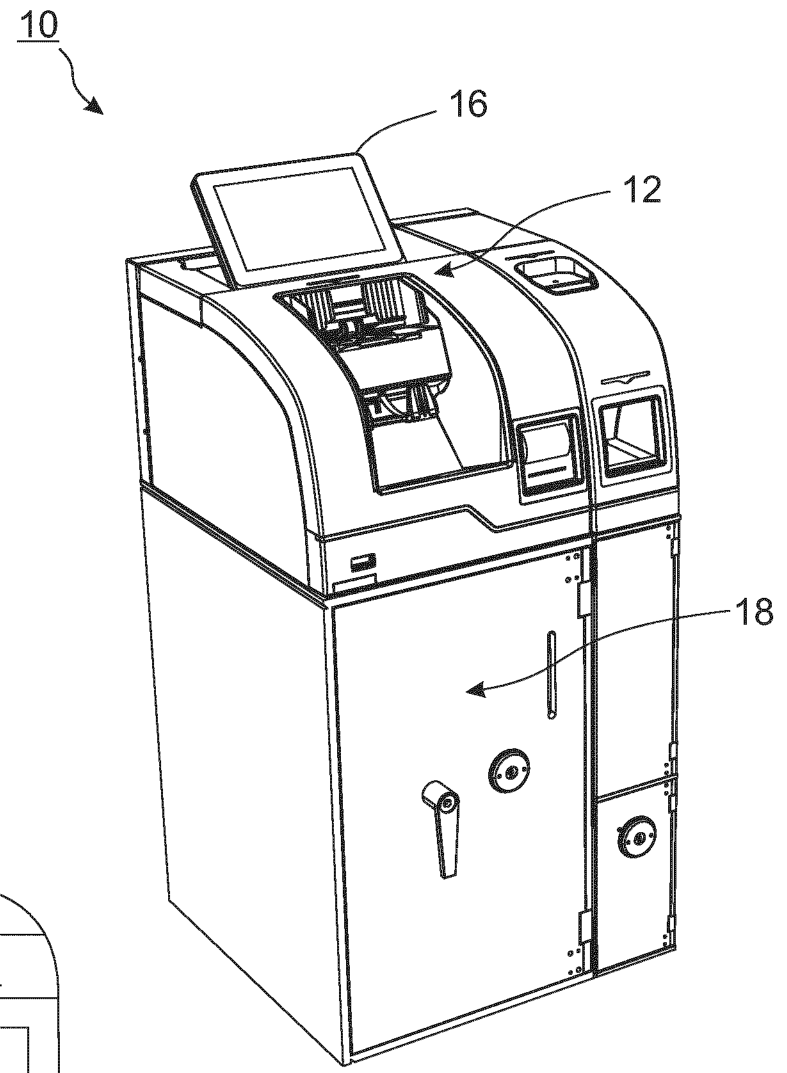
FIG. 7A shows a perspective view of a cash handling machine according to an example embodiment of the disclosure.
Figure 7B:
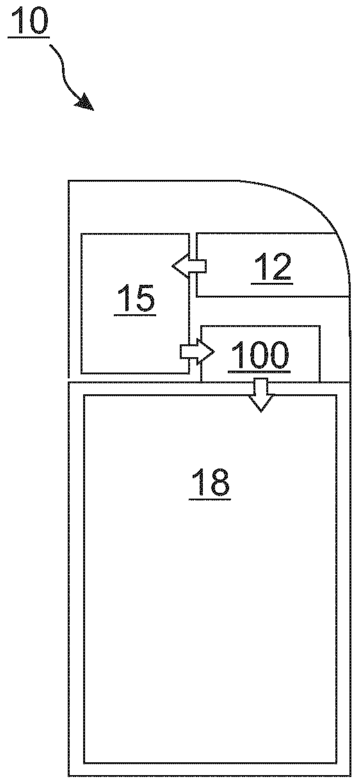
FIG. 7B shows a schematic side view of a cash handling machine of FIG. 7A.

FIGS. 7A and B illustrates a cash handling machine 10 according to an embodiment of the disclosure. The cash handling machine 10 is of a kind usually used for depositing large amounts of cash by personnel for example in stores and financial establishments. The user may enter cash and deposit the cash value electronically to his or her account. The cash is physically transported by the cash handling machine 10 to a storage compartment of the machine.

The cash handling machine 10 of the example embodiment comprises a banknote input unit 12 for allowing a user to input one or more banknotes 20. The user operates the cash handling machine 10 by inputting commands and instructions via an operating interface 16. In response to specific user instructions, the one or more banknotes 20 are transported internally within the machine 10 to a banknote counting and counterfeit determination unit 15 within which the banknotes 20 are counted and investigated to assess if they are genuine or counterfeit. After this process, the one or more banknotes 20 are transported to a banknote stack transport arrangement 100, 200, 300 configured to receive said one or more banknotes 20 and transport the same into a safe 18. The safe 18 is located below the features described already, and the banknote stack transport arrangement 100, 200, 300 may thus transport the one or more banknotes 20 by allowing them to fall into the safe 18 by gravity. The safe 18 may comprise a dedicated storage compartment, such as a heat-sealable cash bag, a canvas bag or a banknote cassette (not shown). Cash handling machines of this kind typically have different access levels or rights. Typically, the safe 18 is not accessible by the users depositing their banknotes 20, which users merely have a limited access to the upper parts of the machine 10. The safe 18 is instead typically maintained by cash-in-transit (CIT) personnel who have full access to the machine 10, including the safe 18. One embodiment of the banknote stack transport arrangement 100, 200, 300 has been described hereinabove. However, the cash handling machine may comprise also other embodiments of the banknote stack transport arrangement within the scope of the appended claims.

The person skilled in the art realizes that the present disclosure by no means is limited to the preferred embodiments described above. On the contrary, many modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A banknote stack transport arrangement for a cash handling machine, comprising:

a first structure having a first end and a second end and presenting a first banknote engagement portion being displaceable in relation to the first structure;

a second structure having a first end and a second end and presenting a second banknote engagement portion being displaceable in relation to the second structure;

wherein the first structure is pivotally arranged at its first end so as to be swingably movable between:

a closed configuration at which the first and the second structures are distanced from each other at the first associated ends for allowing one or more banknotes to enter in between the same, and at which the first and the second banknote engagement portions are in contact with each other at the second associated ends such that they together form at least a bottom part of a temporary banknote receptacle configured to receive the one or more banknotes and support a formation of a banknote stack therein, such that the first banknote engagement portion contacts a face side of the banknote stack and the second banknote engagement portion contacts an edge side of the banknote stack; and an open configuration at which the first and the second banknote engagement portions are separated from each other at the second associated ends so as to define an exit gap;

wherein the second structure is pivotally arranged at its second end so as to be swingably movable between:

a rest position at which the first and the second structures are distanced from each other at the first associated ends; and an active position at which the second structure is configured to press the banknote stack towards the first banknote engagement portion;

wherein the banknote stack transport arrangement is configured to transport the banknote stack out from the temporary banknote receptacle via the exit gap by moving the second structure from the rest position to the active position and by displacing the first and the second banknote engagement portions in relation to the first and the second structures;

wherein the first structure is biased towards the second structure to the closed configuration such that the first structure is configured to move from the closed configuration to the open configuration passively as a result from the displaced banknote stack forcing the opening of the exit gap by its own displacement.

2. The banknote stack transport arrangement according to claim 1, wherein the banknote stack transport arrangement is configured to transport the banknote stack out from the temporary banknote receptacle via the exit gap in one displacement operation.

3. The banknote stack transport arrangement according to claim 1, wherein the first banknote engagement portion is defined by one or more conveyor belts.

4. The banknote stack transport arrangement according to claim 1, wherein the second banknote engagement portion is defined by one or more conveyor belts.

5. The banknote stack transport arrangement according to claim 1, wherein the second banknote engagement portion is defined by one or more rollers.

6. The banknote stack transport arrangement according to claim 1, wherein the second banknote engagement portion extends to the first end of the second structure; and wherein the second structure is configured to, in the active position, press the banknote stack towards the first banknote engagement portion by means of the second banknote engagement portion.

7. The banknote stack transport arrangement according to claim 1, wherein the second structure further presents a banknote engaging surface disposed between the second banknote engagement portion and the first end; and wherein the second structure is configured to, in the active position, press the banknote stack towards the first banknote engagement portion by means of both the second banknote engagement portion and the banknote engaging surface.

8. The banknote stack transport arrangement according to claim 1, wherein the banknote stack transport arrangement is configured to:

initiate the displacing of the first and the second banknote engagement portions at a first time position, and initiate the moving of the second structure at a second time position, wherein the first and the second time positions relate to each other such that the second structure has reached the active position before the first time position.

9. The banknote stack transport arrangement according to claim 1, wherein the banknote transport arrangement further comprises a drive unit configured to, via a drive mechanism, provide kinetic energy to the first and the second structures for displacing the first and the second banknote engagement portions.

10. The banknote stack transport arrangement according to claim 9, wherein the drive unit is further configured to, via the drive mechanism, move the second structure between the rest and the active positions.

11. The banknote stack transport arrangement according to claim 1, wherein the banknote transport arrangement further comprises a banknote stacking wheel configured to receive the one or more banknotes, move the one or more banknotes into the temporary banknote receptacle, and form a banknote stack therein.

12. A cash handling machine comprising:

a banknote input unit for allowing a user to input one or more banknotes;

a safe for storing the one or more banknotes; and a banknote stack transport arrangement according to claim 1;

wherein the banknote transport arrangement is configured to receive the one or more banknotes and transport the same into the safe.

13. A method for transporting one or more banknotes inside a cash handling machine, wherein the cash handling machine comprises:

a first structure having a first end and a second end and presenting a first banknote engagement portion being displaceable in relation to the first structure;

a second structure having a first end and a second end and presenting a second banknote engagement portion being displaceable in relation to the second structure;

wherein the first structure is pivotally arranged at its first end so as to be swingably movable, and wherein the second structure is pivotally arranged at its second end so as to be swingably movable, the method comprising:

receiving, when the first structure is in a closed configuration at which the first and the second structures are distanced from each other at the first associated ends for allowing one or more banknotes to enter in between the same, and at which the first and the second banknote engagement portions are in contact with each other at the second associated ends so as to form at least a bottom part of a temporary banknote receptacle, one or more banknotes in the temporary banknote receptacle and supporting a formation of a banknote stack therein such that the first banknote engagement portion contacts a face side of the banknote stack and the second banknote engagement portion contacts an edge side of the banknote stack;

moving the second structure of the cash handling machine to an active position at which the second structure is configured to press the banknote stack towards the first banknote engagement portion; and displacing the first and the second banknote engagement portions in relation to the first and the second structures so as to transport, when the first structure is in an open configuration at which the first and the second banknote engagement portions are separated from each other at the second associated ends so as to define an exit gap, the banknote stack out from the temporary banknote receptacle via the exit gap;

wherein the first structure is biased towards the second structure to the closed configuration such that the first structure moves from the closed configuration to the open configuration passively as a result from the displaced banknote stack forcing the opening of the exit gap by its own displacement.

14. The method according to claim 13, wherein displacing the first and the second banknote engagement portions is initiated at a first time position;

wherein moving the second structure is initiated at a second time position; and wherein the first and the second time positions relate to each other such that the second structure has reached the active position before the first time position.

* * * * *